United States Patent [19]

Abo

[11] Patent Number: 4,802,455

[45] Date of Patent: Feb. 7, 1989

[54] KNOCKING CONTROL SYSTEM AND METHOD FOR AN INTERNAL COMBUSTION ENGINE

[75] Inventor: Toshimi Abo, Kanagawa, Japan

[73] Assignee: Nissan Motor Company Limited, Yokohama, Japan

[21] Appl. No.: 918,123

[22] Filed: Oct. 14, 1986

[30] Foreign Application Priority Data

Oct. 29, 1985 [JP] Japan .................................. 60-243606

[51] Int. Cl.⁴ .............................................. F02P 5/145
[52] U.S. Cl. .................................................... 123/425
[58] Field of Search .................................. 123/425, 435

[56] References Cited

U.S. PATENT DOCUMENTS

| | | | |
|---|---|---|---|
| 4,376,429 | 3/1983 | Youngblood | 123/425 |
| 4,517,945 | 5/1985 | Ishigami et al. | 123/425 |
| 4,517,952 | 5/1985 | Hosoya | 123/638 |
| 4,549,513 | 10/1985 | Douaud et al. | 123/425 |
| 4,565,171 | 1/1986 | Sugiura et al. | 123/425 |
| 4,582,032 | 4/1986 | Hara et al. | 123/339 |
| 4,640,249 | 2/1987 | Kawamura et al. | 123/425 |
| 4,658,787 | 4/1987 | Takizawa | 123/418 |
| 4,658,789 | 4/1987 | Morita | 123/422 |
| 4,660,535 | 4/1987 | Asano | 123/425 |
| 4,690,116 | 9/1987 | Takahashi | 123/425 |
| 4,690,124 | 9/1987 | Higashiyama | 123/643 |
| 4,694,800 | 9/1987 | Morita | 123/425 |

FOREIGN PATENT DOCUMENTS

| | | | |
|---|---|---|---|
| 58-135365 | 8/1983 | Japan | 123/425 |
| 59-572 | 1/1984 | Japan | 123/425 |
| 60-184970 | 9/1985 | Japan | 123/425 |

*Primary Examiner*—Andrew M. Dolinar
*Attorney, Agent, or Firm*—Foley & Lardner, Schwartz, Jeffery, Schwaab, Mack, Blumenthal & Evans

[57] ABSTRACT

A knocking control system and method for a multi-cylinder engine includes a limit value for a retardation angle correction amount which is derived separately for each engine cylinder and prevents inappropriate ignition timing resulting from malfunction of the knock detection system. Consequently, undue engine wear can be prevented.

9 Claims, 3 Drawing Sheets

KNOCKING CONTROL SYSTEM AND METHOD FOR AN INTERNAL COMBUSTION ENGINE

BACKGROUND OF THE INVENTION

The present invention relates to a knocking control system and method for a multi-cylinder internal combustion engine and more particularly to a system and a method for suppressing engine knocking in each of the engine cylinders of a vehicular engine.

It is important to determine the ignition timing of the internal combustion engine so as to produce the best efficiency for current conditions. In general, ignition timing most preferably approaches MBT (Minimum Advance for Best Torque) as long as engine knocking does not occur.

A Japanese Patent Application Unexamined Open No. Sho 59-196973 published on Nov. 8, 1984 exemplifies a conventional knocking control system. In the above-identified Japanese document, the ignition timing for each of the engine cylinders is retarded when knocking occurs in the corresponding engine cylinder. In this way, knocking is controlled by controlling the engine ignition timing separately for each cylinder.

However, in this conventional knocking control system, the retardation angle correction amount applied to the ignition timing of each cylinder is independent of the other retardation angle correction amounts for the other engine cylinders. Therefore, if a knock detection system for a particular engine cylinder malfunctions, the ignition timing of that engine cylinder may be advanced to the extreme so that the knocking in that engine cylinder becomes very intense. Consequently, the durability of the engine is reduced.

On the other hand, another knocking control system has been developed which has a fail-safe system capable of coping with malfunction of the knock detection system in each cylinder. This is exemplified by a Japanese Patent Application Examined Open No. Sho 60-20584.

In the above-identified Japanese document, in cases where knocking information is not available due to malfunction of the knock detection system and therefore correction of the retardation angle is not possible, malfunction of the vibration acceleration detection system used to detect engine knocking is detected and a retardation angle correction of the ignition timing is carried out. As a result, unnecessary correction of the retardation angle is prevented and the safety of the engine is taken into consideration when malfunction of the knock detection system is detected.

However, the above-described knocking control system does not detect knocking in each engine cylinder but merely performs blanket control of all of the engine cylinders. In addition, at low engine speeds at which the background vibration level of the engine is reduced, the difference between the knocking sensor output signal levels during malfunction of the knocking sensor and during normal operation thereof is not conspicuous, and therefore, difficulties arise in detecting malfunction of the knock detection system.

Hence, the above-described knocking control system does not solve the above-described problem of the conventional knocking control system for the individual engine cylinders.

SUMMARY OF THE INVENTION

With the above described problem in mind, it is a general object of the present invention to provide an improved knocking control system and method for an internal combustion engine.

It is another object of the present invention to provide the engine knocking control system and method which prevents improper ignition timing due to malfunction of a knock detection system.

It is still another object of the present invention to provide a knocking control system and method which prevents undue wear on the engine due to knocking caused by improper ignition timing.

The above-described objects can be achieved by providing a knocking control system for a multi-cylinder engine comprising: (a) first means for detecting engine operation conditions; (b) second means for detecting the occurrence of knocking in each of the engine cylinders; (c) third means for setting a basic advance angle value for ignition timing on the basis of the engine operating conditions detected by the first means; (d) fourth means for calculating an angle correction amount for each engine cylinder by which the basic advance angle value set by the third means is to be adjusted toward the retarded-ignition side so as to suppress knocking when knocking is detected by the second means and toward the advanced-ignition side when the second means detects no knocking; (e) fifth means for calculating a limit value for the angle correction amounts on the basis of the angle correction amounts calculated by the fourth means and limiting the angle correction amounts to no more than the limit value; (f) sixth means for correcting the basic advance angle value set by the third means for each cylinder according to the angle correction amount for the corresponding cylinder calculated by the first means and limited by the fifth means and determining a final advance angle value for each cylinder from the correction thereof; and (g) seventh means for igniting an air-fuel mixture supplied to each engine cylinder on the basis of the final advance angle value for that cylinder.

BRIEF DESCRIPTION OF THE DRAWINGS

A more complete understanding of the present invention may be obtained from the following detailed description taken in conjunction with the attached drawings in which.

DETAILED DESCRIPTION OF THE PREFERRED EMBODIMENTS

Reference will be made to the drawings in order to facilitate understanding of the present invention.

FIGS. 1 through 4 show a first preferred embodiment of a knocking control system according to the present invention.

The knocking control system includes internal pressure-responsive sensors $1a$ through $1f$ disposed on respective angle cylinders (this embodiment is applied to a six-cylinder engine). The pressure-responsive sensors $1a$ through $1f$ convert combustion pressures within the respective cylinders into electric charges and output corresponding charge signals S1 to associated charge amplifiers $2a$ through $2f$. The charge amplifiers $2a$ through $2f$ convert the charge signals into corresponding voltage signals. The voltage signals are then inputted to a multiplexor (MPX)3. The multiplexor (MPX)3 selectively switches the voltage signals derived from the charge amplifiers $2a$ through $2f$ and outputs the voltage signals S2i (i=1 through 6, denoting cylinder number) in a fixed sequence based on the reference position signals Ca derived from a crank angle sensor 4. The voltage signals S2i outputted from the multiplexor (MPX)3 are sent to a band-pass filter (BPF)5.

The crank angle sensor 4 outputs the reference position signal Ca which goes high (H) at a predetermined position before top dead center in the compression stroke (TDC) of each cylinder (, e.g., BTDC 70°). In the case of the six-cylinder engine, a reference position signal pulse Ca is output after every 120° of crankshaft rotation and in the case of a four-cylinder engine, after every 180° of crankshaft rotation. The crank angle sensor 4 also outputs a unit angle signal C1 which goes high (H) after every unit angle of crankshaft rotation (, e.g., one degree). It should be noted that if the number of pulses in the signal C1 are counted over a unit of time, engine revolution speed Ne can be determined.

The band-pass filter (BPF)5 passes only those signal components of the inputted signals S2i in the frequency band (, e.g., 5 kilohertz to 20 kilohertz) corresponding to knocking vibrations. The signal components passed by the band-pass filter (BPF)5 are sent to a rectifier-integrator 6 as a signal S3i. The rectifier-integrator 6 carries out full-wave rectification (or half-wave rectification) of the signal S3i from the band pass-filter (BPF). In a predetermined crank angle range in which knocking is most likely to occur, e.g., the crank angle range from 10° to 45° after top dead center in the compression stroke, the integrator 6 integrates the fully rectified signal S3i to derive an integration value Si representing a physical quantity associated with combustion vibration energy. The derived integration value Si is inputted to a microcomputer 7.

Figure 1A:
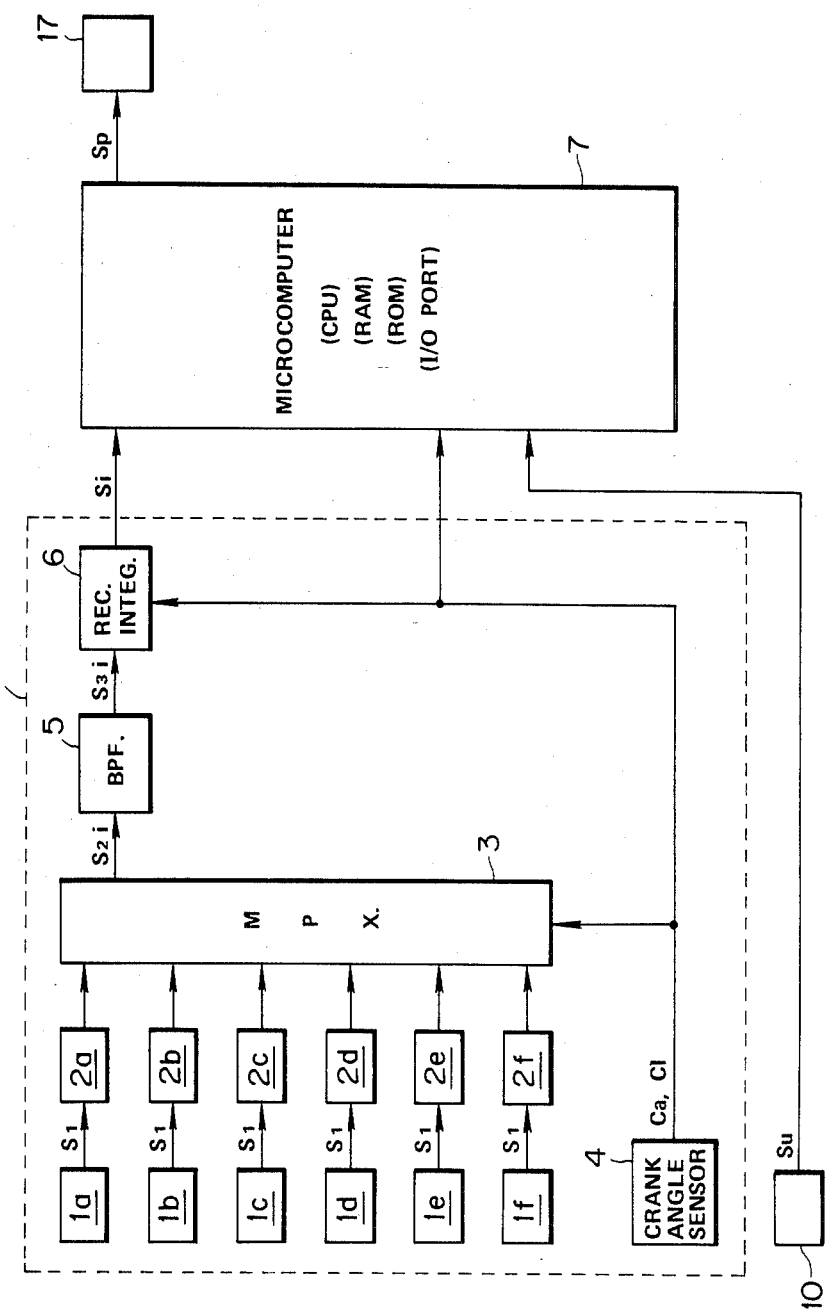
FIG. 1(A) is a circuit block diagram of a knocking control system for a six-cylinder internal combustion engine in a first preferred embodiment according to the present invention.
Figure 1B:
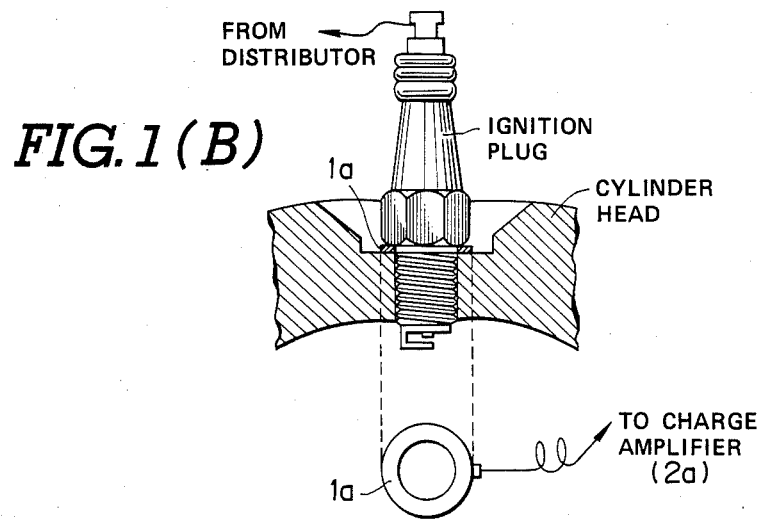
FIGS. 1(B) and 1(C) show examples of the pressure-responsive sensor and the charge amplifier shown in FIG. 1(A), respectively.
Figure 1C:
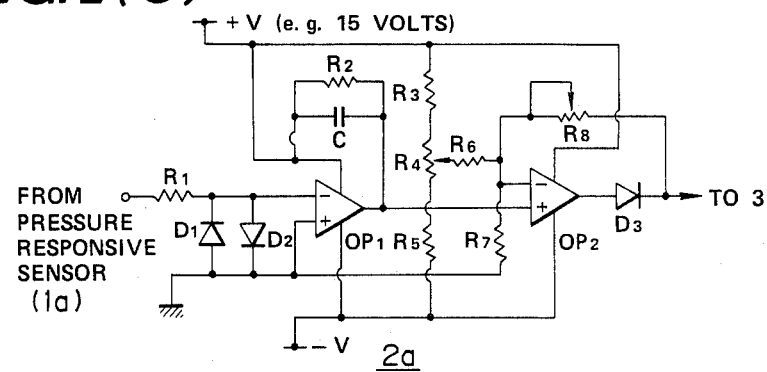

FIGS. 1(B) and 1(C) show specific examples of a pressure-responsive sensor $1a$ mounted on one of the engine cylinders and a charge amplifier $2a$ connected to the pressure-responsive sensor $1a$, respectively.

It is noted that the above-described internal-pressure-responsive sensors $1a$ through $1f$, the charge amplifiers $2a$ through $2f$, the crank angle sensors 4, the band-pass filter (BPF) 5, and the rectifier-integrator 6 constitute knock detecting means 8.

The microcomputer 7 receives a signal Su from an engine operating condition detecting means 10. The engine operating condition detecting means 10 outputs the signal Su indicative of engine load derived from, e.g., the intake air quantity.

Figure 2:
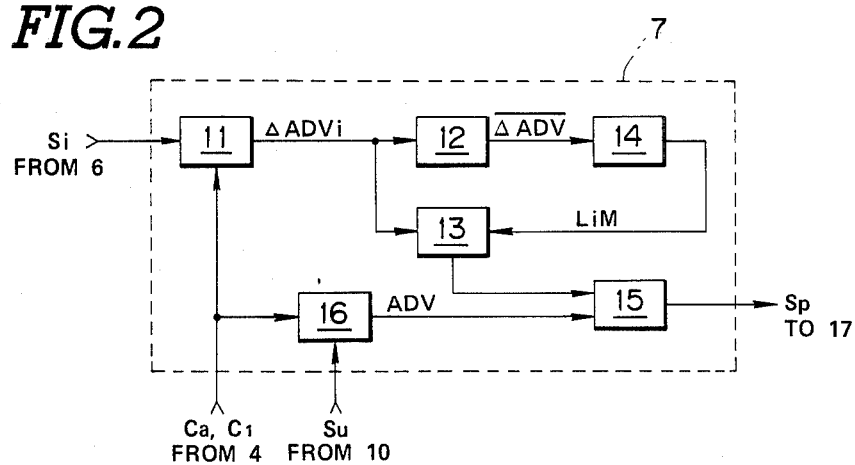
FIG. 2 is a functional block diagram of a microcomputer of the engine knocking control system in the first preferred embodiment.

In FIG. 2, the microcomputer 7 includes functionally a correction amount calculation circuit 11. The correction amount calculation circuit 11 compares the integrated value Si from the rectifier-integrator 6 with a predetermined threshold value S/L and based on the results, decides whether or not engine knocking has occurred. According to the results of the comparison, a retardation angle correction amount $\Delta ADVi$ for the ignition timing is calculated for each of the cylinders. The calculated retardation angle correction amount $\Delta ADVi$ is sent to an average value calculation circuit 12 and to a limiting circuit 13. The average value calculation circuit 12 derives the average $\Delta ADV$ of the retardation angle amounts $\Delta ADV$ for all of the cylinders and outputs the average value to an addition circuit 14. The addition circuit 14 adds a predetermined value $\gamma$ to the calculated average value $\Delta ADV$ and sends a resulting limit value Lim (Lim=$\Delta ADV+\gamma$) to a limiting circuit 13. The limiting circuit 13 receives the retardation angle correction amount $\Delta ADVi$ for each cylinder and determines whether the magnitude of retardation angle correction amount $\Delta ADVi$ for any of the cylinders exceeds the limit value Lim. If the value $\Delta ADVi$ exceeds the limit value Lim, the retardation angle correction amount(s) $\Delta ADVi$ for the corresponding cylinder(s) is limited to the value Lim and the resulting value Lim is sent to a final advance angle setting circuit 15. On the other hand, if $\Delta ADVi$ does not exceed the limit value Lim, the retardation angle correction amount(s) for the corresponding cylinder(s) are directly sent to a final advance angle setting circuit 15.

The final advance angle setting circuit 15 also receives a basic advance angle value ADV from a basic advance angle setting circuit 16. The basic advance angle setting circuit 16 sets the basic advance angle of the ignition timing according to engine operating conditions (in this embodiment, according to engine load and engine revolution speed derived from the crank angle sensor 4). The basic advance angle is derived by the table look-up technique, i.e., by retrieving an appropriate value from a predetermined basic advance angle table stored in a ROM to be described later. The final advance angle setting circuit 15 calculates the final advance angle $\theta i$ for each cylinder in accordance with the following equation.

$$\theta i = ADV + \Delta ADVi \quad (1)$$

provided that when $\Delta ADVi > Lim$, $\Delta ADVi$ in the right side of the equation (1) is replaced with the value Lim.

In FIG. 1, an ignition command signal Sp is sent to ignition means 17 at a timing determined by the final advance angle setting circuit 15. The ignition means 17 includes an ignition coil, distributor, and ignition plugs disposed in corresponding engine cylinders. The ignition coil generates a high-voltage surge in response to the ignition signal Sp so that the high-voltage surge generated at the ignition coil (secondary winding thereof) is sent to the ignition plug via the distributor at the calculated ignition timing (in the explosion stroke) for each cylinder. Consequently, the air-fuel mixture supplied to the corresponding cylinder is ignited and burned.

The microcomputer 7 functions as a basic advance angle setting means, correction amount calculating means, limit value calculating means, and final advance angle setting means. The microcomputer 7 specifically comprises a CPU (Central Processing Unit), a ROM (Read-Only Memory). a RAM (Random-Access Memory), and an I/O port. In addition, the functions shown in FIG. 2 are executed in accordance with a program described later to control ignition timing as to suppress knocking.

Figure 3:
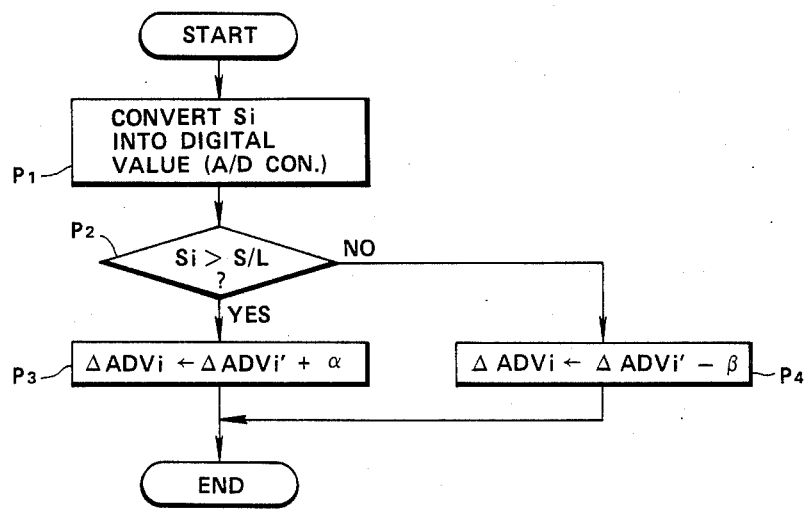
FIG. 3 is a processing flowchart for calculating a retardation angle correction amount.

FIG. 3 is a processing flowchart for calculating the retardation angle correction amount.

In a step P1, the rectified and integrated value Si from the rectifier-integrator circuit 6 converted from an analog voltage to a digital value.

In a step P2, the microcomputer 7 compares the A/D-converted value with the threshold value S/L to check for the occurrence of knocking in each of the cylinders.

If $Si > S/L$ (Yes in the step P2), the microcomputer 7 determines that knocking has occurred and the routine goes to a step P3. In the step P3, the present retardation angle correction amount $\Delta ADVi$ is adjusted so as to correct the ignition timing of the corresponding cylinder toward the retarded side in accordance with the following equation (2):

$$\Delta ADVi = \Delta ADVi' + \alpha \qquad (2)$$

wherein $\Delta ADVi'$ denotes the previously calculated retardation angle correction amount and $\alpha$ denotes a predetermined value.

On the other hand, if $Si \leq S/L$ (No in the step P2), the microcomputer determines that knocking has not occurred in the corresponding cylinder and the routine goes to a step P4. The present retardation angle correction amount $\Delta ADVi$ is then adjusted toward the advance side in accordance with the following equation (3):

$$\Delta ADVi = \Delta ADVi' - \beta \qquad (3)$$

wherein $\beta$ denotes another predetermined value.

In this way, the retardation angle correction amount $\Delta ADVi$ is adjusted for each cylinder depending on the presence or absence of knocking.

Figure 4:
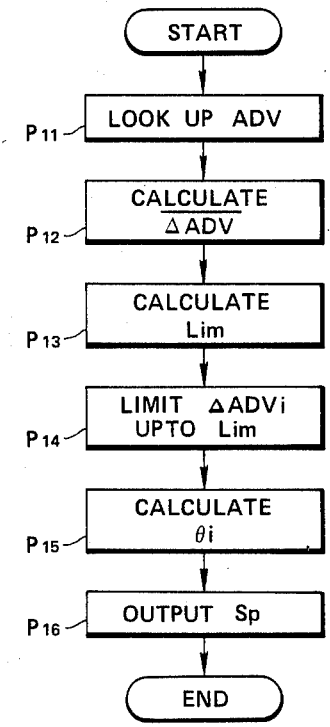
FIG. 4 is a processing flowchart for explaining an ignition timing control procedure in the first preferred embodiment.

FIG. 4 is a processing flowchart for controlling the ignition timing in each cylinder in the first preferred embodiment.

In a first step P11, the basic advance angle value ADV is retrieved as described above.

In a step P12, the average value $\Delta ADV$ is calculated in accordance with the following equation (4):

$$\Delta ADV = \frac{1}{6} \sum_{i=1}^{6} \Delta ADVi \qquad (4)$$

Next, in a step P13, the limit value Lim for the angle correction amount is calculated in the following equation (5):

$$Lim = \Delta ADV + \gamma \qquad (5)$$

wherein $\gamma$ denotes another predetermined value.

In a step P14, a magnitude of the retardation angle correction amount $\Delta ADVi$ for each cylinder is compared with the limit value Lim. If $\Delta ADVi > Lim$, the retardation angle correction amount $\Delta ADVi$ for the corresponding cylinder is limited to (replaced with) Lim since the calculated value $\Delta ADVi$ appears to be abnormally large compared with those for the other cylinders, and the routine goes to a step P15.

In the step P15, the final advance angle value $\theta i$ for each cylinder is calculated in accordance with the above-described equation (1). In the step P16, the ignition signal Sp is outputted at the timing determined in the step $P_{15}$.

In the way described above, if for any of the cylinders, the inequality $\Delta ADVi > Lim$ is satisfied, the microcomputer 7 determines that there is an abnormality in the knock detection system for the corresponding cylinder and limits the retardation angle correction amount $\Delta ADVi$ for the corresponding cylinder to the limit value Lim. Hence, abnormal distributions of ignition timing among the cylinders are suppressed and improper ignition timings are avoided. Thus, even if it becomes impossible to detect knocking, no excessive advance or retardation of the ignition timing for the corresponding cylinder will be allowed. This is mediated by reference to the correction information for the ignition timings of the other cylinders.

Consequently, undue wear on the engine can be prevented.

Figure 5:
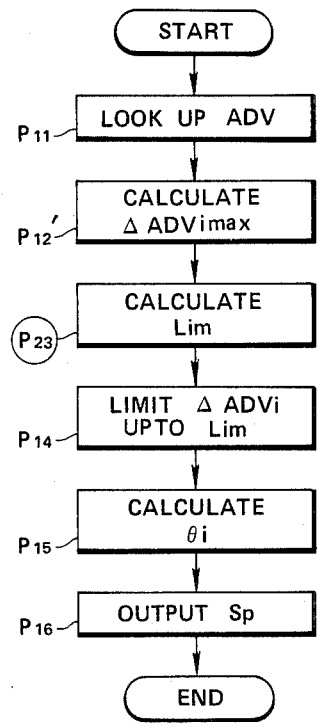
FIG. 5 is another processing flowchart for explaining the ignition timing control procedure carried out by a second preferred embodiment.

FIG. 5 shows a second preferred embodiment.

In the second preferred embodiment, the method of calculation the limit value Lim is different from that used in the first embodiment.

In FIG. 5, in a step P23 which is encircled, the microcomputer 7 finds the largest $\Delta ADVimax$ of the retardation angle correction amounts calculated for all of the cylinders, i.e., the greatest correction value (toward the retardation angle side) and calculates the limit value Lim in accordance with the following equation (6) on the basis of the maximum retardation angle correction amount $\Delta ADVimax$:

$$Lim = \Delta ADVimax + \gamma \qquad (6)$$

wherein $\gamma$ denotes a predetermined value.

The other steps are the same as shown in FIG. 4 provided that in a step $P_{12}$, the above-described $\Delta ADVimax$ is calculated.

Hence, the same effect can be achieved as in the first preferred embodiment. In addition, since the abnormal value of the retardation angle correction amount resulting from the malfunction of the knock detection system is not included in the calculation process (averaging process) of the limit value Lim, a more precise knock suppression control can be achieved.

As described hereinabove, the knocking control system and method according to the present invention can avoid abnormal distributions of ignition timing among multiple cylinders due to malfunction(s) of the knock detection system(s) and ensures ignition timing suitable for the suppression of knocking. Consequently, undue wear on the engine can be prevented.

It will clearly be appreciated by those skilled in the art that the foregoing description is made in terms of preferred embodiments and various changes and modifications may be made witout departing from the scope of the present invention which is to be defined by the appended claims.

What is claimed is:

1. A knocking control system for a multi-cylinder engine comprising:
   (a) first means for detecting engine operating conditions;
   (b) second means for detecting the occurrence of knocking in each of the engine cylinders;
   (c) third means for setting a basic advance angle value for ignition timing on the basis of the engine operating conditions detected by said first means;

(d) fourth means for calculating an angle correction amount for each engine cylinder by which the basic advance angle value set by said third means is to be adjusted toward the retarded-ignition side so as to suppress knocking when knocking is detected by said second means and toward the advanced-ignition side when said second means detects no knocking;

(e) fifth means for calculating a limit value for the angle correction amounts calculated by said fourth means on the basis of an average value of the angle correction amounts for all cylinders and limiting said angle correction amounts to no more than said limit value;

(f) sixth means for correcting the basic advance angle value set by said third means for each cylinder according to the angle correction amount for the corresponding cylinder calculated by said fourth means and limited by said fifth means and determining a final advance angle value for each cylinder from the correction thereof; and (g) seventh means for ignition an air-fuel mixture supplied to each engine cylinder on the basis of the final advance angle value for that cylinder.

2. The system according to claim 1, wherein said sixth means replaces the angle correction amount with the limit value when the correction amount calculated by said fourth means exceeds the limit.

3. The system according to claim 2, wherein said fifth means calculates the limit value by adding a predetermined value to said average value of said angle correction amounts.

4. A system comprising:
(a) first means for detecting engine operating conditions;
(b) second means for setting a basic advance angle of an ignition timing for each engine cylinder on the basis of the detected engine operating conditions;
(c) third means, associated with each of said cylinders, for detecting a physical quantity corresponding to a pressure vibration energy in each cylinder;
(d) fourth means for determining whether engine knocking has occurred in each of the cylinders on the basis of the physical quantity detected by said third means;
(e) fifth means for calculating a correction value for each cylinder by which the basic advance angle is to be adjusted toward one of the advanced- and retarded-ignition directions depending on the results from said fourth means;
(f) sixth means for determining whether said third means for each cylinder is malfunctioning on the basis of the correction value calculated by said fifth means;
(g) seventh means for setting the correction value to a limit value calculated on the basis of the average of the correction values for all cylinders so as to avoid excessive advance of the ignition timing for any and all cylinders for which said sixth means determines that the corresponding third means is malfunctioning; and (h) eighth means for determining a final advance angle for each cylinder from the basic advance angle set by said second means and the correction value calculated by said fifth means and set by said seventh means, and for igniting an air-fuel mixture supplied to the corresponding engine cylinder at the timing corresponding to the final advance angle.

5. The system according to claim 4, wherein said sixth means determines whether said third means for each cylinder is malfunctioning by checking whether the correction value calculated by said fifth means for the corresponding cylinder exceeds the limit value.

6. The system according to claim 5, further comprising ninth means for adding a predetermined value to said average of said correction values to derive said limit value.

7. A method comprising the steps of:
(a) detecting engine operating conditions;
(b) setting a basic advance angle of an ignition timing for each engine cylinder on the basis of the engine operating conditions detected in said step (a);
(c) providing detecting means for detecting a physical quantity corresponding to a pressure vibration energy in each cylinder;
(d) determining whether engine knocking has occurred in each of the engine cylinders on the basis of the individual physical quantity detected by said detecting means;
(e) calculating a correction value for each cylinder by which the basic advance angle set in said step (b) is to be adjusted toward one of advanced-and-retardation-ignition timing angle directions depending on the results in said step (d);
(f) setting a limit value for the correction value for each cylinder calculated in said step (e) on the basis of an average of the correction values for the individual cylinders;
(g) determining whether the correction value for any engine cylinder calculated in said step (e) exceeds the limit value set in aid step (f);
(h) determining a final ignition advance angle for each cylinder according to the results of said step (g) from the basic advance angle and correction value calculated in said step (e) and determined in said step (g); and
(i) igniting an air-fuel mixture supplied to each cylinder at a timing corresponding to the final advance angle for the corresponding cylinder determined in said step (h).

8. The method according to claim 7, wherein said step (f) comprises the step of adding a predetermined value to the averaged value to derive the limit value.

9. The method according to claim 7, wherein said step (h) determines the final ignition advance angle for any engine cylinder from the basic advance angle set in said step (b) and limit value set in said step (f) when the correction value for the corresponding cylinder exceeds the limit value.

* * * * *